(12) United States Patent
Dinh

(10) Patent No.: US 6,262,566 B1
(45) Date of Patent: Jul. 17, 2001

(54) DC-TO-DC CONTROLLER HAVING A MULTI-PHASE SYNCHRONOUS BUCK REGULATOR

(75) Inventor: James S. Dinh, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/594,010

(22) Filed: Jun. 15, 2000

(51) Int. Cl.[7] ..................................................... G05F 1/40
(52) U.S. Cl. ............................................................ 323/282
(58) Field of Search .................................... 323/282, 351; 363/62; 307/64, 66

(56) References Cited

U.S. PATENT DOCUMENTS 5,656,870 * 8/1997 Turnbull .................................. 307/64
5,861,738 * 1/1999 Becker-Irvin et al. ............... 323/282

* cited by examiner

Primary Examiner—Adolf Deneke Berhane
(74) Attorney, Agent, or Firm—Antonelli, Terry, Stout & Kraus, LLP

(57) ABSTRACT

A DC-to-DC regulator that includes a multi-phase synchronous buck regulator having a pulse width modulator to generate a plurality of switching signals, a plurality of drivers, each coupled to receive one of the switching signals, and a plurality of switching voltage converters, each coupled to receive an output from one of the drivers and an input voltage, wherein the outputs of the switching voltage converters are combined to form an output voltage. The multi-phase synchronous buck regulator can be implemented on a motherboard, such as on an interposer board or directly on a PU chip.

26 Claims, 13 Drawing Sheets

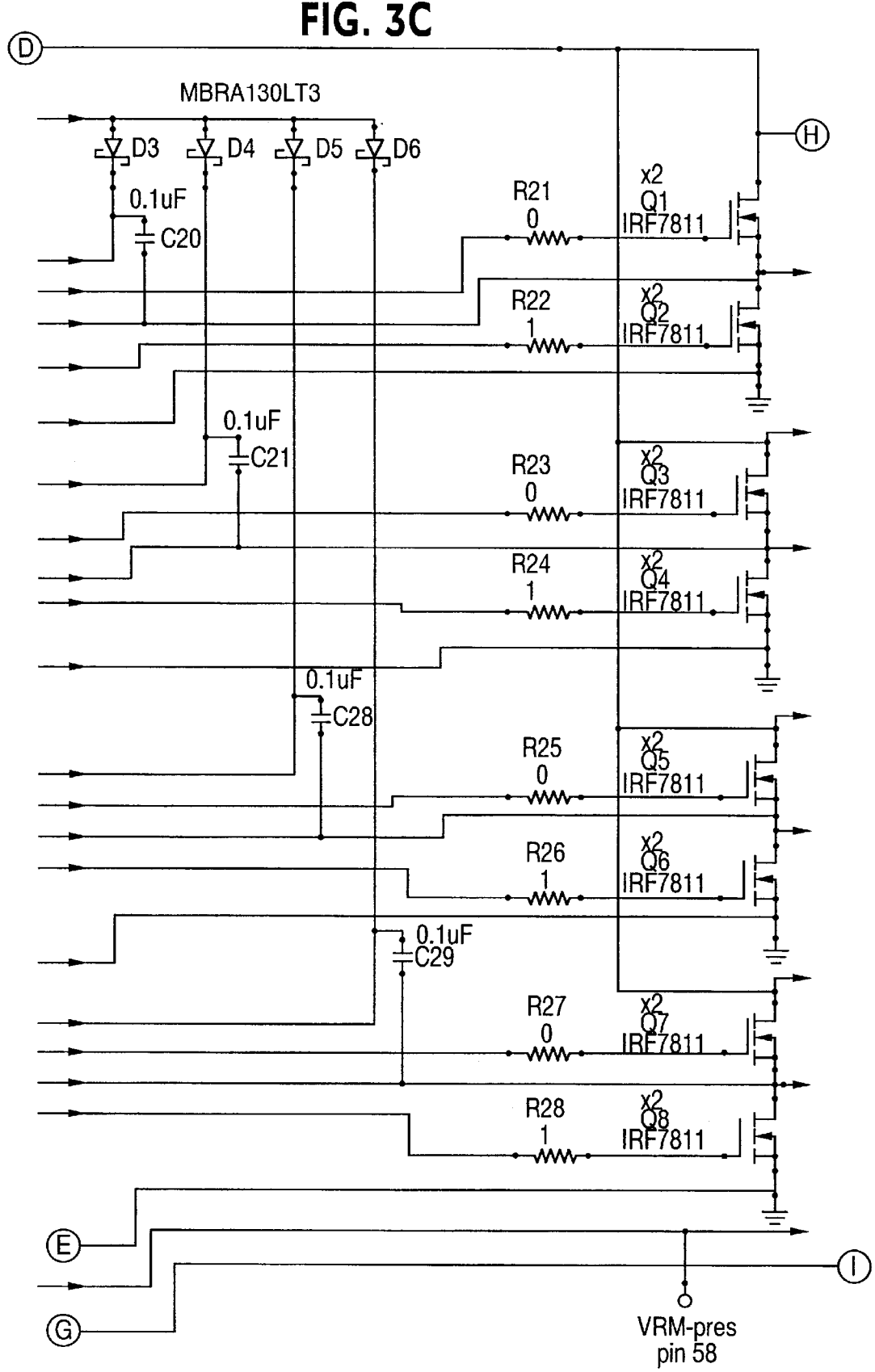

DROOP AND CURRENT SHARE CIRCUIT

OVP TRIP POINT = 2.098v

DC-TO-DC CONTROLLER HAVING A MULTI-PHASE SYNCHRONOUS BUCK REGULATOR

FIELD

The invention generally relates to voltage regulators and in particular to multi-phase pulse width modulated (PWM) direct-current (DC) to DC voltage regulators.

BACKGROUND

Most electronic circuits, from simple transistors and op-amp circuits up to elaborate digital and microprocessor systems, require one or more sources of stable DC voltage. DC-to-DC converters are well-known in the art. Such circuitry or devices are typically employed to convert from one DC voltage signal level to another DC voltage signal level. This may be useful in a variety of environments.

Today's sophisticated processing units (PUs) have made the job of the power supply designer more difficult. These PUs continue to demand ever higher currents and lower voltages. One problem is providing a desired, highly regulated, voltage which may vary in a range, such as, for example, from 0.96 volts to 1.04 volts, and that may depend, at least in part, on clock speed. Another challenge is to provide this voltage at relatively high currents that may vary from several hundred milliamps, up to, for example, 120 amps, and back again, in a clock cycle, for example. Furthermore, yet a third challenge is to provide a scalable design that meets these higher current requirements by using multiple instances of a common building block connected together in parallel. Therefore, a need exists for a DC-to-DC regulator circuit that is at least closer to accomplishing these objectives, or at least one of them, than state-of-the-art circuitry.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. In the drawings, like reference numbers generally indicate identical, functionally similar, and/or structurally similar elements. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein.

DETAILED DESCRIPTION

Figure 1:
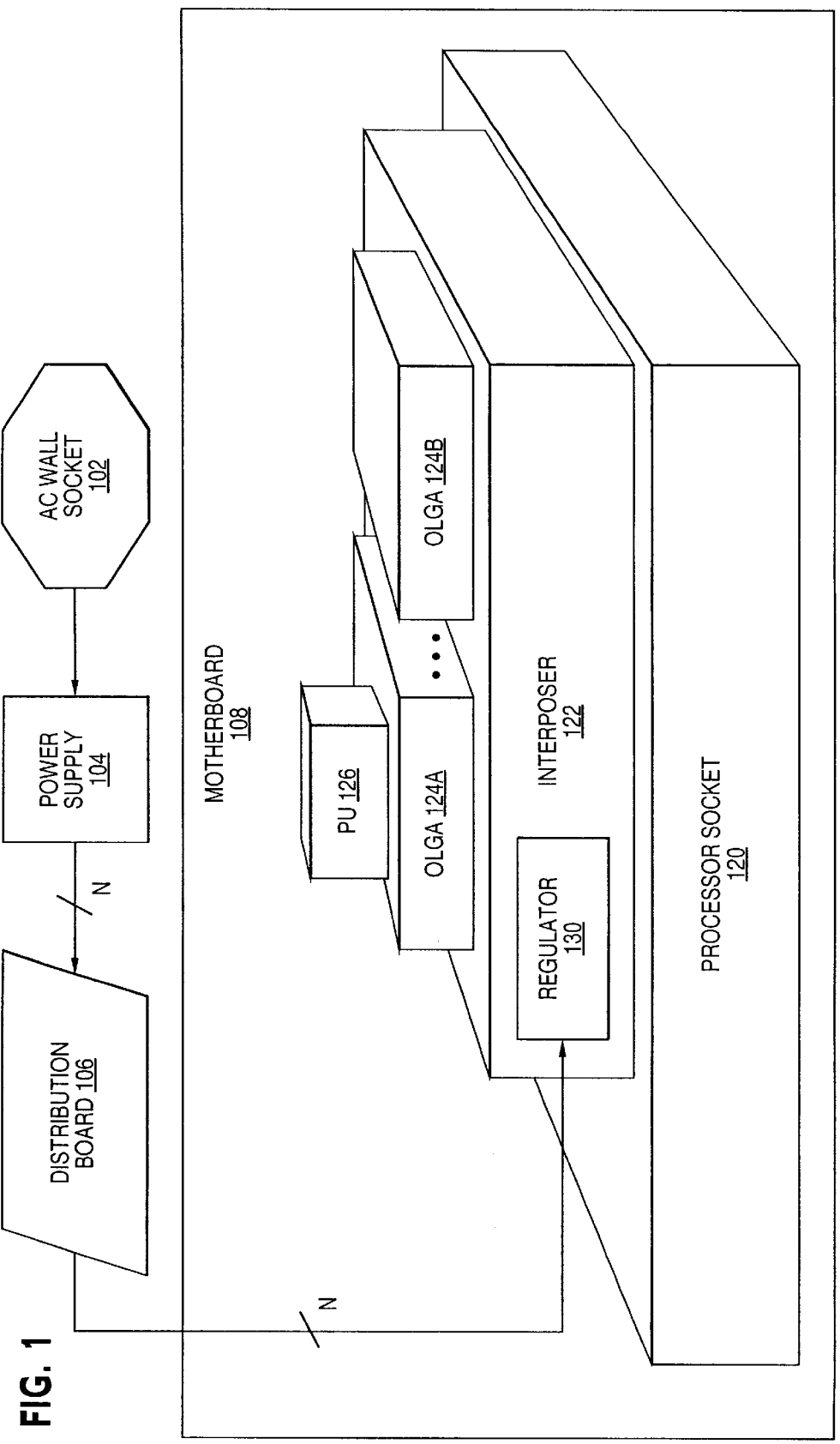
FIG. 1 is a block diagram illustrating a multi-phase synchronous buck regulator implemented on a motherboard according to an example embodiment of the present invention.

Before beginning a detailed description of the subject invention, mention of the following is in order. When appropriate, like reference numerals and characters may be used to designate identical, corresponding or similar components in differing figure drawings. Further, in the detailed description to follow, example sizes/models/values/ranges may be given, although the present invention is not limited to the same. Well known power/ground connections to integrated circuits (ICs) and other components may not be shown within the figures for simplicity of illustration and discussion, and so as not to obscure the invention. Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuit diagrams) are set forth in order to describe example embodiments of the invention, it should be apparent to one skilled in the art that the invention can be practiced without these specific details.

Reference in the specification to "one example embodiment" or "an example embodiment" means that a particular feature, structure, or characteristic described in connection with the embodiment is included in at least one embodiment of the invention. The appearances of the phrase "in one example embodiment" in various places in the specification are not necessarily all referring to the same embodiment.

An example embodiment of the present invention is directed to a DC-to-DC regulator that includes a multi-phase synchronous buck regulator having a pulse width modulator to generate a plurality of switching signals, a plurality of drivers, each coupled to receive one of the switching signals, and a plurality of switching voltage converters, each coupled to receive an output from one of the drivers and an input voltage, wherein the outputs of the switching voltage converters are combined to form an output voltage. The multi-phase synchronous buck regulator can be implemented on a motherboard, such as on an interposer board or directly on a PU chip.

FIG. 1 is a block diagram illustrating a multi-phase synchronous buck regulator 130 implemented on a computer motherboard 108 according to an example embodiment of the present invention. An alternating current (AC) wall socket 102 provides an AC current to a power supply 104. Power supply 104 converts the AC signal into one or more DC voltages (where the number of DC voltages is given by N). For example, power supply 104 can convert the AC signal into two DC voltages, 12 volts and 5 volts. A distribution board 106 distributes the DC voltages to various loads, including regulator 130. Distribution board 106 provides a low impedance, low inductance path to the load (e.g., memory, chip sets, PU).

Regulator 130 is implemented on a motherboard 108 (sometimes alternatively referred to, for example, as a processor host board). Motherboard 108 includes an interposer 122 that plugs into a processor socket 120, one or more Organic LAN Grid Arrays (OLGAs) 124 (shown as 124A and 124B), and one or more PUs 126. Regulator 130 converts the one or more input DC voltages received from distribution board 106 to an output voltage that is used by PU 126. Regulator 130 therefore provides the complex, highly regulated voltages required by PU 126. Regulator 130 converts any of the N input DC voltages to an output DC voltage that can range, for example, from 0.9 volts to 1.6 volts, depending on the clock speed of PU 126. Acceptable tolerances in the output voltage signal are often expressed as a percentage of the mean output voltage. According to an example embodiment of the present invention, regulator 130 provides an output voltage of 1 volt±4% (i.e., the output voltage can range from 0.96 volts to 1.04 volts). Further, regulator 130 provides an output voltage even where the current load varies from 0 amps (e.g., where PU 126 is in stand-by) to 200 amps and above, and back again in a single clock cycle.

Prior voltage regulators were implemented on a card separate from motherboard 108. These voltage regulator cards were therefore plugged into a socket separate from the processor socket. These plug-in voltage regulators require that many decoupling capacitors be implemented on motherboard 108, interposer 122, and OLGA 124 to handle the dynamic response requirements of PU 126. Decoupling capacitors require a significant amount of real estate on motherboard 108, increase cost, block air flow through the system and contribute to system heating. Further, the distributed impedance associated with the distribution and interconnect between the plug-in voltage regulator and motherboard 108 limits the performance of plug-in voltage regulators.

According to the present invention, regulator 130 is implemented on motherboard 108, rather than as a separate plug-in module, minimizing the distributed impedance between regulator 130 and PU 126. According to an example embodiment, as depicted in FIG. 1, regulator 130 can be implemented on interposer board 122. In this first example embodiment, regulator 130 can provide an output DC voltage to one or more PUs 126. According to another example embodiment, regulator 130 can alternatively be implemented directly on PU 126. In this second example embodiment, regulator 130 provides an output DC voltage to the PU on which regulator 130 is implemented. These example embodiments are described in greater detail below.

According to an example embodiment of the present invention, regulator 130 is implemented using surface mount technology (SMT) output inductors and capacitors, and a number of low inductance, low capacitance, low on-resistance surface mount packages 8-pin package (S08). As a result, the dynamic response of regulator 130 is greatly improved due to its low output impedance path. The number of required output capacitors within regulator 130 is reduced, freeing up more space on interposer 122.

Figure 2:
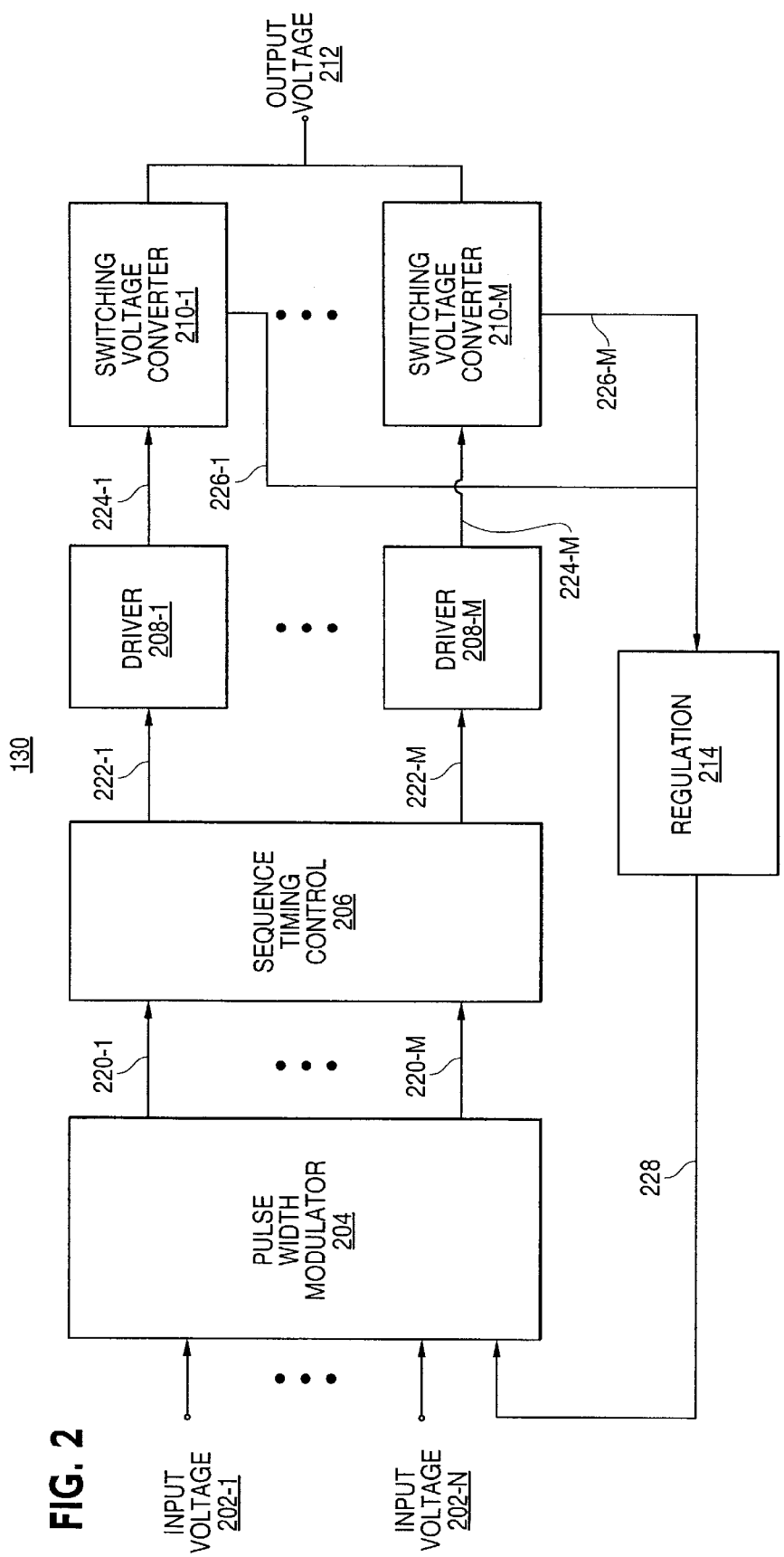
FIG. 2 is a block diagram illustrating the multi-phase synchronous buck regulator in greater detail according to an example embodiment of the current invention.

FIG. 2 is a block diagram illustrating an M-phase synchronous buck regulator 130 in greater detail according to an example embodiment of the current invention, where M is the number of phases in the multi-phase regulator. Regulator 130 includes a pulse width modulator 204, a sequence timing control 206, a number of drivers 208 equal to the number of phases (shown as 208-1 through 208-M), a similar number of switching voltage converters 210 (shown as 210-1 through 210-M), and a regulation circuit 214. The input DC voltages 202 (shown as 202-1 through 202-N) from power supply 104 are input to regulator 130. Regulator 130 converts input voltages 202 to an output voltage 212.

Pulse width modulator 204 generates a number of switching signals 220 equal to the number of phases M (shown as 220-1 to 220-M). The switching signals may be square-wave in shape, and are out of phase from one another. For example, with a four-phase regulator, pulse width modulator 204 generates four switching signals, where the signals from one phase to the next are separated by 90°. For each of the M phases, the switching signal power is boosted by driver 208 (the boosted signals are depicted by lines 224-1 through 224-M). Driver 208 provides the power necessary to drive switching voltage converter 210 at a high frequency.

Sequence timing control 206 insures that regulator 130 will operate properly regardless of the sequencing of input DC voltages 202. Prior voltage regulators required that, whenever multiple input DC voltages were allowed, they were required to follow a particular preset temporal pattern. For example, a prior voltage regulator that received as input a 12 volt and a 5 volt DC signal, the prior voltage regulator might require that the 12 volt and 5 volt signals alternate over time. Deviation from this pattern could potentially result in catastrophic failure for the voltage regulator. Requiring a known pattern of sequencing requires a more complex and expensive system. According to the present invention, sequencing timing control 206 allows the input DC voltages to come up or down at random, in any sequence, by insuring that drivers 208 turn on before pulse width modulator 204.

According to an example embodiment of the present invention, switching voltage converter 210 represents a pulse width modulated (PWM) series-switch step-down converter. PWM converters can be used to obtain a lower voltage from a higher one by using a low-impedance transistor switch that is made to open and close periodically between input and output. The transistor switch is driven by the switching voltage generated by pulse width modulator 204. As is well known in the art, any desired output voltage lower than the input voltage can be obtained by varying the width of the "on" time switching signal. Example implementations of switching voltage converter 210 are described in greater detail below.

Output voltage 212 is formed by combining the outputs of the switching voltage converters 210. The output capacitance of regulator 130 causes a ripple on output voltage 212. The output can be modeled as a capacitance in series with an inductance and a resistance. Even under steady-state conditions, the capacitor will charge and then discharge, causing the output ripple. One advantage of the present invention is that the ripple components from each phase cancel one another, which can reduce the total output ripple by a factor of 10 or more.

Further, regulation circuit 214 provides the feedback necessary for voltage regulation. The particular implementation of regulation circuit 214 can vary according to whether a voltage mode topology or a current mode topology is used. Example embodiments of regulation circuit 214 are described in greater detail below.

Figure 3:
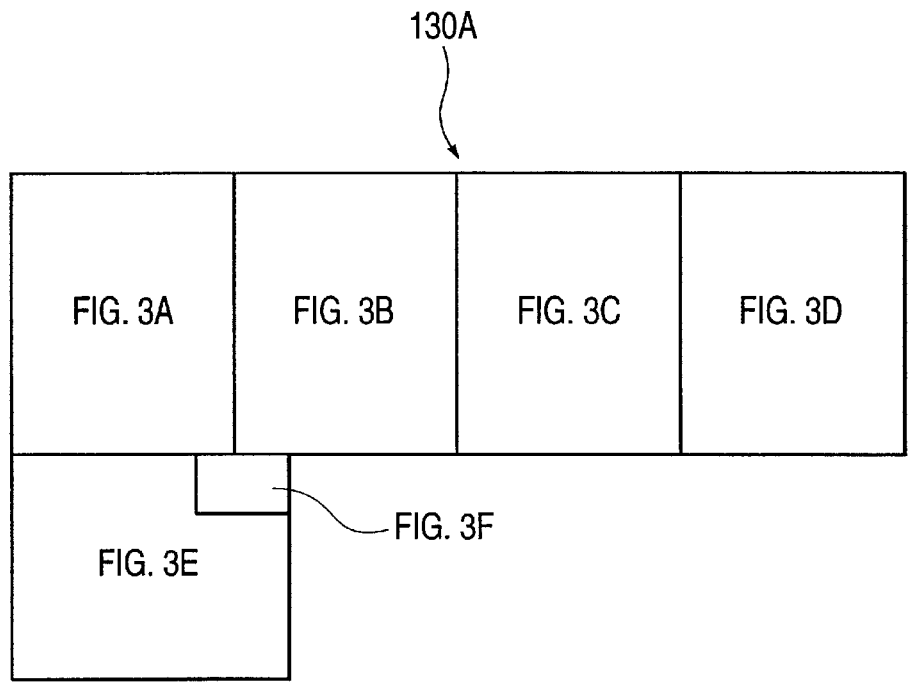
FIG. 3 represents an overall circuit layout for combining the circuit parts of FIGS. 3A–3F, such circuit illustrating a four-phase synchronous buck regulator according to an example embodiment of the present invention, where the regulator is implemented on a PU.

FIG. 3 represents an overall circuit layout for combining the circuit parts of FIGS. 3A–3F, such circuit illustrating a four-phase synchronous buck regulator 130A according to an example embodiment of the present invention, where regulator 130A is implemented on PU 126. interconnectable arrow heads (">>") are used to designate conduction paths which should be reconnected between the various circuit parts, while a smaller number of reconnectable conduction paths have been marked with matching encircled letters in neighboring circuit parts to help index and align the conduction paths which should be reconnected. A remainder of this disclosure should be taken as referring to the overall circuit in its assembled form, and the terminology "FIG. 3" may hereinafter be used to refer to the assembled overall circuit. Regulator 130A receives input DC voltage 202-1 (+12 volts for the example shown in FIG. 3) and input DC voltage 202-2 (+5.6 volts for the example shown in FIG. 3). The output voltage 212 terminal appears on the right-hand side of the overall figure. Example regulator 130A can provide, for example, 60 amps of current to PU 126.

According to an example embodiment of the present invention, regulator 130A is implemented around a perimeter of a PU 126 chip. Also, thermal vias and a multiple layer copper plane are used to equally and quickly dissipate heat from the switching MOSFETs (within switching voltage converters 210) to the open air. As a result, heat sinks are not required for dissipating heat from the switching MOSFETs.

Pulse width modulator 204 can be implemented, for example, using Semtech's programmable, multi-phase, high performance PWM controller SC1146, and the supporting circuitry shown in FIG. 3. The four switching signals 222 generated by the SC1146 are shown as pins Drv0 through Drv3.

The example sequence timing control circuit 206 depicted in FIG. 3 includes resistors R46 and R48, capacitors C42 and C44, and diodes D11A, D11B, D12A, D12B, and D13A, configured as shown in FIG. 3. Example values for the resistors and capacitors included within this example sequence timing control circuit 206 are shown in FIG. 3. The diodes within this example sequence timing control circuit 206 can be implemented using Phillip Electronics' diodes BAW56. For example regulator 130A, the example sequence timing control circuit depicted in FIG. 3 insures that regulator 130A operates correctly regardless of the sequence of input voltages 202-1 and 202-2.

Each of the four drivers 208 can be implemented, for example, using SEMTECH's high speed synchronous power MOSFET smart driver SC1405, and the supporting circuitry shown in FIG. 3. Each driver 208 receives a switching signal 222 generated by pulse width modulator 204, and outputs the boosted signal at the pin labeled TG.

Switching voltage converters 210 are each implemented using similar parts. For example, switching voltage converter 210-1 includes diode D3, capacitors C19, C20, and C23, resistors R20, R21, and R22, MOSFETs Q1 and Q2, and inductor L1, configured as shown in FIG. 3. Example values for the resistors, capacitors, and inductor included within these example switching voltage converters 210 are shown in FIG. 3. The diodes within these example switching voltage converters 210 can be implemented using MOTOROLA diodes MBRA13OLT3. The MOSFETs Q1 and Q2 can be implemented using INTERNATIONAL RECTIFIER's MOSFETs IRF7809/IRF7811. The inductor L1 can be implemented using VISHAY's inductor IHLP 5050FD-01.

Note that many of the components depicted in FIG. 3 have a "x" followed by a number in close proximity to the component symbol. This indicates that the component is implemented using the stated number of duplicate components connected in parallel. For example, "x2" appears just above the label for capacitor C40. This indicates that C40 represents two capacitors, each having a value of 1 $\mu$F, connected in parallel.

The outputs of switching voltage converters 210-1 through 210-4 are tied together to form output voltage 212. FIG. 3 depicts an example output capacitance given by capacitors C10, C11, C39, and C40.

The example regulation circuit 214 depicted in FIG. 3 includes resistors R69, R70, R73, R29, and R63. The positive terminal of output voltage 212 is fed back to pin FB 14, whereas the negative terminal is fed back to pin FBG 16. The example regulation circuit 214 also includes an alternative feedback path indicated by VoSen(+) and VoSen(−), where these terminals represent remote sensing.

According to the example embodiment of the present invention, regulator 130A can also include a droop circuit, an example of which is shown in FIG. 3. This example droop circuit includes resistors R43, R49, R50, R53, R54, R59, R55, and R56, capacitor C47, op-amp U3A, and N-channel transistor Q10, configured as shown in FIG. 3. Example values for the resistors and the capacitor included within this example droop circuit are shown in FIG. 3. Op-amp U3A can be implemented, for example, using TEXAS INSTRUMENTS op-amp TL072. N-channel transistor Q10 can be implemented, for example, using MOTOROLA's NPN transistor MMBT3904.

As described above, output voltage 212 for many applications must stay within a well defined range of acceptable values. In the example given above, output voltage 212 can vary from 0.96 volts to 1.85 volts, where 1.6 volts is the mean steady state output voltage, otherwise referred to herein as the voltage identification ($V_{ID}$) setting. However, the current requirements of PU 126 vary over time. For example, PU 126 can go from a stand-by mode, requiring from zero to a few hundred milliamps, to a power-on mode requiring 100 amps and above, and back to stand-by mode, all in the span of a single clock cycle. The step-up transition in the current load (i.e., from stand-by to power-on modes) causes a transitory dip in output voltage 212. Conversely, the step-down transition in the current load (i.e., from power-on to stand-by modes) causes a transitory spike in output voltage 212. In order to maintain proper operation, regulator 130 should insure that output voltage 212 remains within the defined range of acceptable values, even during dips and spikes due to step-up and step-down transitions. The magnitude of the dips and spikes can be lessened by adding additional output capacitance.

The droop circuit allows the circuit designer to program the $V_{ID}$ setting of output voltage 212. For the example droop circuit shown in FIG. 3, the $V_{ID}$ setting is programmed by selecting particular values for resistors R55 and R56. For example, the values shown for resistors R55 and R56 result in a droop voltage of 40 millivolts, i.e., the output voltage 212 is increased by 40 millivolts. This makes better use of the available range of output voltage because magnitude of the dip caused by the step-up transition is often larger than the magnitude of the spike caused by the step-down transition. In other words, by increasing the $V_{ID}$ setting, dips due to the step-up transition are less likely to cross the lower acceptable boundary of output voltage 212. And because the spikes due to step-up transitions are lower in magnitude relative to the dips, increasing the $V_{ID}$ setting may not result in increased violations of the upper acceptable boundary of output voltage 212.

By adding droop voltage to increase the $V_{ID}$ setting, the number of capacitors that are required to control the magnitude of the step-up transition dips can be reduced. For example, where output voltage 212 is constrained to 1 volt±4%, adding a 40 millivolt droop reduces the amount of capacitance by 25 percent.

Further, the example droop circuit shown in FIG. 3 has the additional advantage of being very fast, which means that the droop circuit can respond quickly to AC transient load events and can provide the 40 millivolt drop voltage to the circuit. This increased speed results in better dynamic performance for regulator 130A.

According to the example embodiment of the present invention, regulator 130A can also include a current sharing circuit, an example of which is shown in FIG. 3. This example current sharing circuit includes resistors R60, R62, and R68, capacitor C48, op-amp U3B, and diode D14A, configured as shown in FIG. 3. Example values for the resistors and the capacitor included within this example current sharing circuit are shown in FIG. 3. Op-amp U3B can be implemented, for example, using TEXAS INSTRUMENTS op-amp TL072. Diode D14A can be implemented, for example, using PHILLIPS ELECTRONICS diode BAW56.

The current sharing circuit insures that the current load is distributed evenly between multiple regulators 130A that are connected together in parallel. The current sharing circuit therefore makes regulator 130A scalable in the sense that multiple regulator modules can be combined to satisfy larger current requirements. Without the current sharing circuit, there is no guarantee that each regulator module will carry an equal portion of the total current load. This can result in particular modules carrying a load greater than they are designed for, which can damage the module.

Figure 5A:
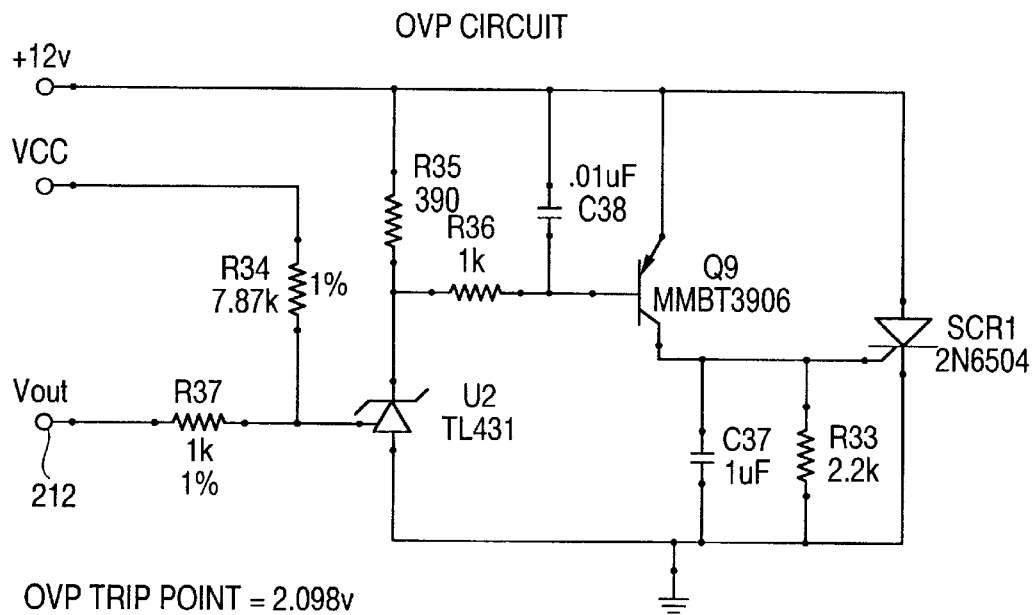
FIGS. 5A and 5B are circuit diagrams illustrating a first and second over-voltage protection circuit according to example embodiments of the present invention.

According to the example embodiment of the present invention, regulator 130A can also include an over-voltage protection circuit, an example of which is shown in FIG. 5A. The overvoltage protection circuit monitors output voltage 212, and halts operation of regulator 130A if the output voltage crosses a certain threshold. This example overvoltage protection circuit includes resistors R33, R34, R35, and R37, capacitors C37 and C38, reference Zener diode U2 and a synchronous controlled rectifier SCR1, and P-channel transistor Q9, configured as shown in FIG. 5A. Example values for the resistors and capacitors included within this example overvoltage protection circuit are shown in FIG. 5A. Reference Zener diode U2 can be implemented, for example, using Texas Instruments reference regulator TL431. Synchronous controlled rectifier SCR1 can be implemented, for example, using Motorola rectifier 2N6504. P-channel transistor Q9 can be implemented, for example, using Motorola P-channel transistor MMBT3906. The output voltage threshold is 2.098 volts for the example overvoltage protection circuit depicted in FIG. 5A.

Very high frequency switching signals 220 can be achieved using the design of regulator 130A according to the present invention. Prior regulators have achieved switching frequencies of approximately 250 kHz per phase (total of 1 MHz for a four phase design). Regulator 130A can achieve at least a 1–2 MHz switching rate per phase (total of 4–8 MHz). This increased switching frequency is due, in part, to several factors: (i) the selection of fast drivers 208 with low output impedance and low input capacitance MOSFETs within switching voltage converter 210, (ii) the decreased loop inductance (and therefore increased speed) resulting from moving regulator 130A onto PU 126, and (iii) the selection of high Q and low resistance output inductors within switching voltage converter 210. The output inductors should be very small and very efficient in order to support the high switching rate of regulator 130A.

Switching at high frequencies results in many benefits for regulator 130A. As PU 126 power requirements increase, regulator 130A must either switch faster or use larger components. Faster switching means that smaller capacitors can be used at the output of regulator 130A, saving chip real estate and costs associated with the additional capacitive components. Also, regulator 130A can respond more quickly to step-up and step-down transitions by PU 126. Faster switching reduces the voltage dip associated with the step-up transitions. Another advantage is that regulator 130A can be implemented using surface mount technology (SMT) rather than through-hole technology which is bulky and more difficult to manufacture.

Figure 3A:
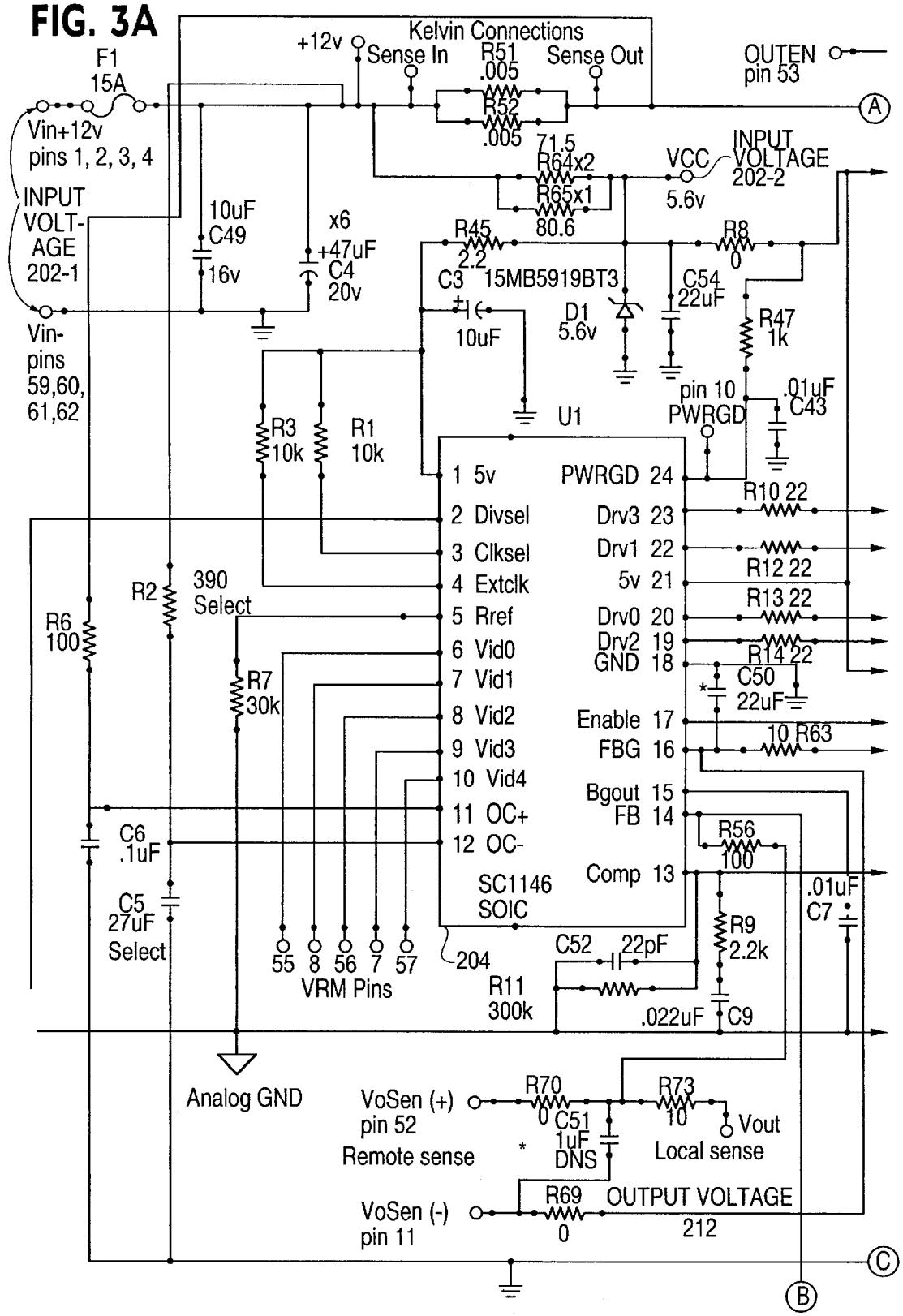
Figure 3B:
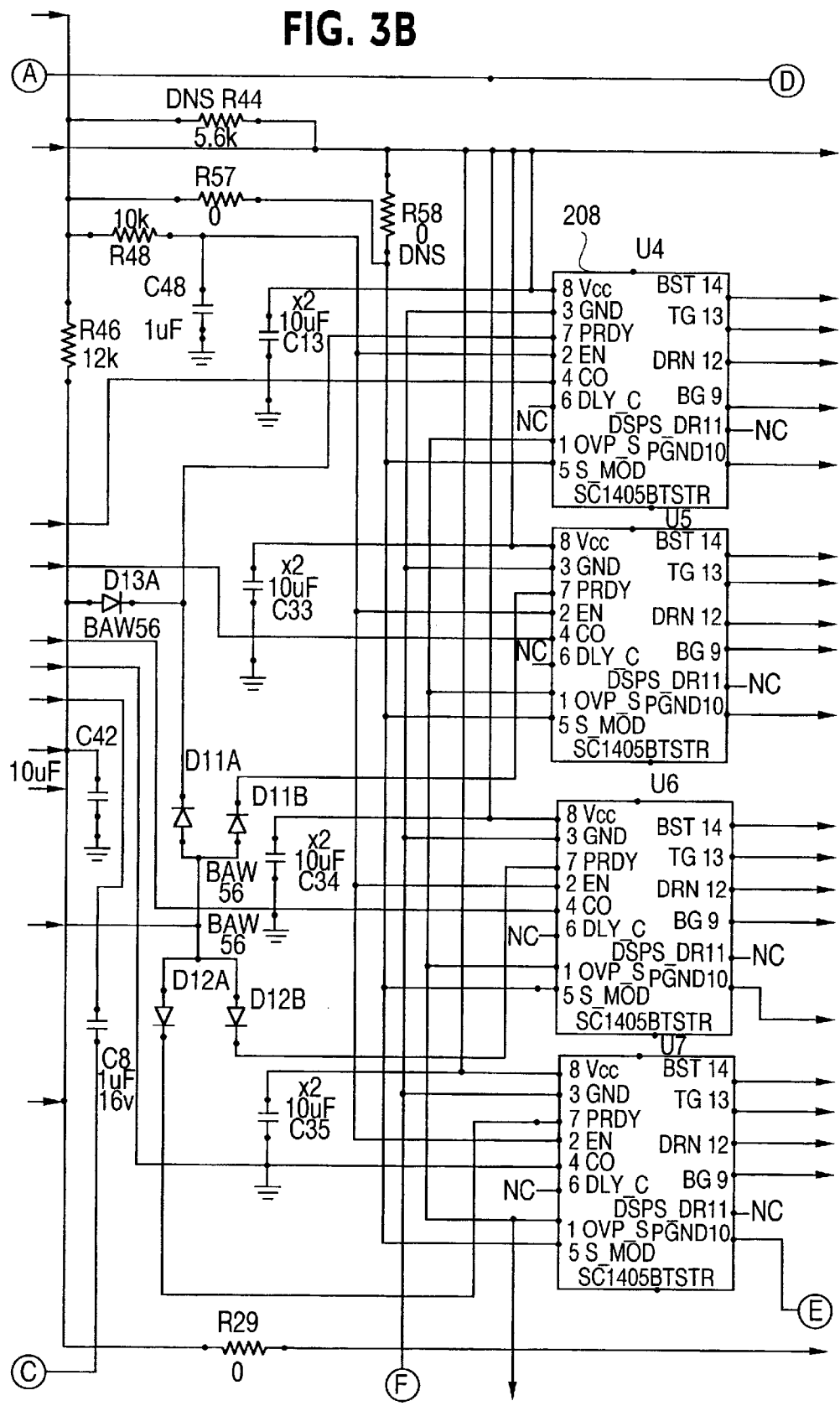
Figure 3D:
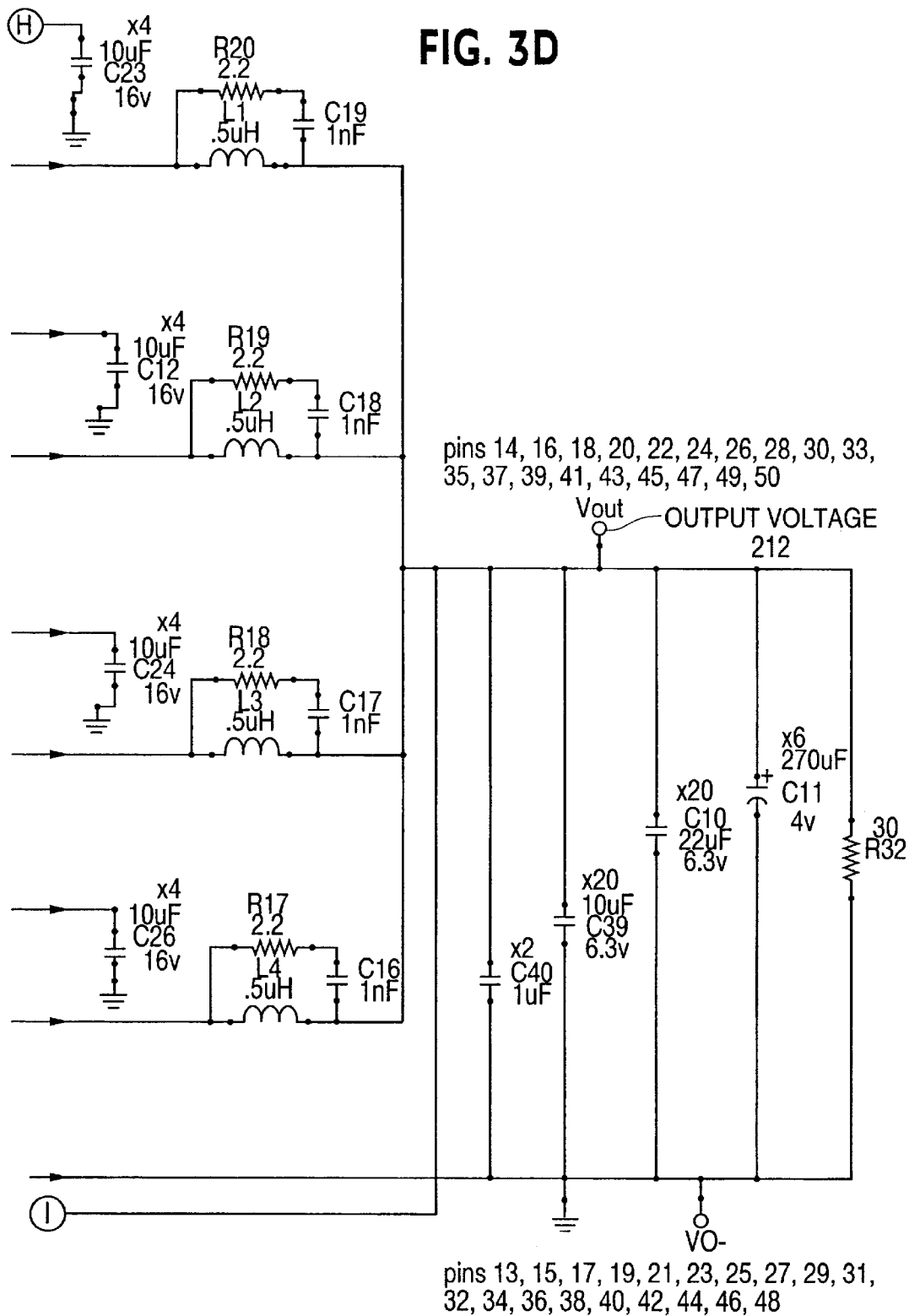
Figure 3E:
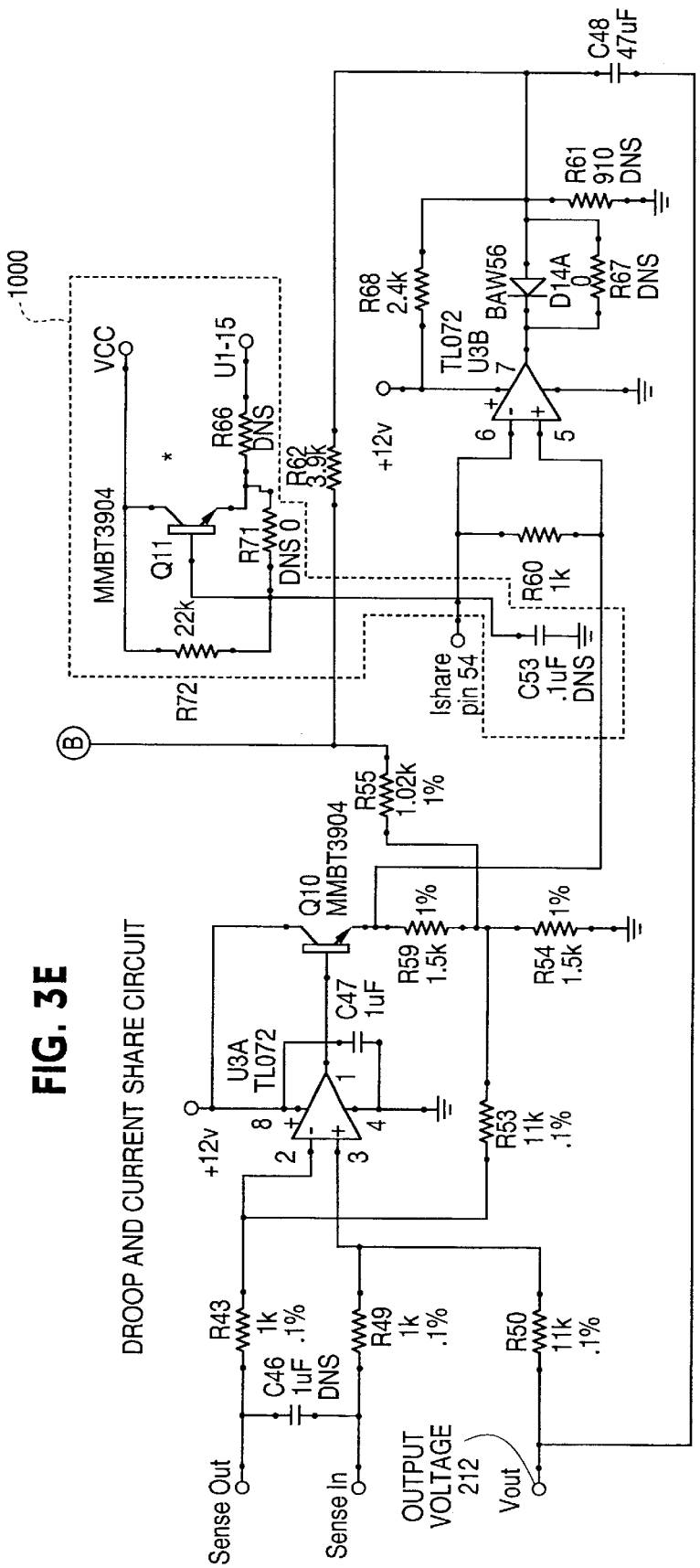
Figure 3F:
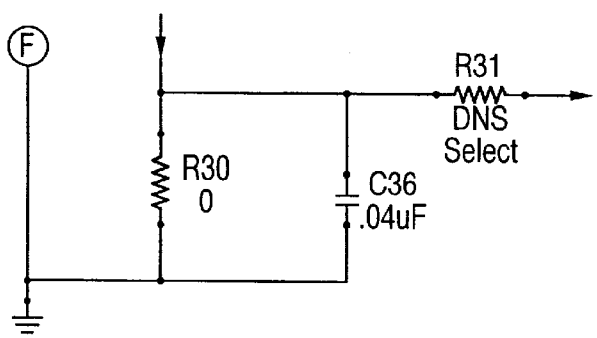

In another example embodiment, the components within an area 1000 in FIG. 3E may be able to be omitted. Further, throughout the drawing pertaining to example circuits, any component having a designation "DNS" associated therewith may be omitted.

Figure 4:
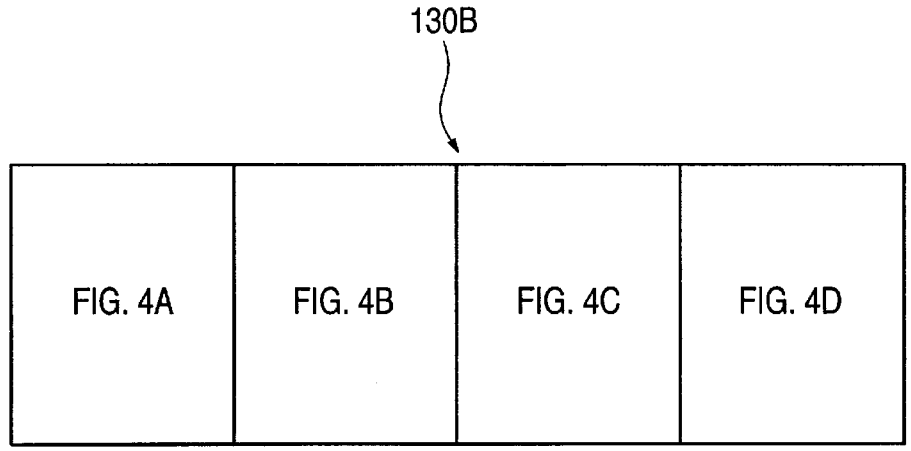
FIG. 4 represents an overall circuit layout for combining the circuit parts of FIGS. 4A–4D, such circuit illustrating a four-phase synchronous buck regulator according to an example embodiment of the present invention, where the regulator is implemented on an interposer.

FIG. 4 represents an overall circuit layout for combining the circuit parts of FIGS. 4A–D, such circuit illustrating a four-phase synchronous buck regulator 130B according to another example embodiment of the present invention, where regulator 130B is implemented on interposer 122. Again, just like with FIG. 3, interconnectable arrow heads and indexing encircled letters are used with respect to reconnectable conduction paths, and the terminology "FIG. 4" will hereinafter be used to refer to the assembled overall circuit. Regulator 130B receives input DC voltage 202-1 (+12 volts for the example shown in FIG. 4) and input DC voltage 202-2 (+5.0 volts for the example shown in FIG. 4). The output voltage 212 terminal appears on the right-hand side of FIG. 4.

According to an example embodiment of the present invention, regulator 130B can provide output voltage 212 to multiple PUs 126 resident on motherboard 108. The example regulator 130B depicted in FIG. 4 is designed to supply a total of 120 amps of current to two PUs 126. Those skilled in the art will recognize that the design of regulator 130B can easily be extended to support more than two PUs 126.

According to the example regulator 130B embodiment, pulse width modular 204 can be implemented, for example, using INTERSIL's PWM controller HIP6301, in addition to the supporting circuitry shown in FIG. 4. The HIP6301 has a built-in droop circuit, which operates in a manner similar to the droop circuit described above with respect to FIG. 3.

The example sequence timing control circuit 206 depicted in FIG. 4 includes resistors R198 and R223, capacitor C101, and diode CR18, configured as shown in FIG. 4. This example sequence timing control circuit operates in a manner similar to that described above with respect to the example sequence timing control circuit depicted in FIG. 3. Example values are shown in FIG. 4 for the resistors and capacitor included within this example sequence timing control circuit 206. Diode CR18 can be implemented, for example, using MOTOROLA diode IN4148.

The four drivers 208 can be implemented as described above with respect to FIG. 3, for example, using SEMTECH's high speed synchronous MOSFET smart driver SC1405, and the supporting circuitry shown in FIG. 4. The switching voltage converter 210 within each phase are each implemented using similar parts. For example, switching voltage converter 210-1 as shown in FIG. 4 includes diode CR3, capacitors C77, C94, Cd, and C227, resistors R37, R39, R77, R217, R52, and R106, MOSFETs Q15 and Q21, and inductor L5, configured as shown in FIG. 4. Example values for the resistors, capacitors, and inductor included within these example switching voltage converters 210 are shown in FIG. 4. The diodes within these example switching voltage converters 210 can be implemented using MOTOROLA diodes MBRA130LT3. The MOSFETs switches can be implemented using INTERNATIONAL RECTIFIER's MOSFETs IRF7809/IRF7811. The inductors can be implemented using Vishay's inductor IHLP5050FD-01.

The outputs of switching voltage converters 210-1 through 210-4 are tied together to form output voltage 212. FIG. 4 depicts an example output capacitance given by capacitors Ci, Cj, Ck, and Cl.

The example regulation circuit 214 depicted in FIG. 4 differs from the regulation circuit described above with respect to FIG. 3 in that regulator 130B is implemented using a current mode topology, whereas regulator 130A is implemented using a voltage mode topology. Current mode topologies require both voltage and current feedback, where voltage mode topologies require only voltage feedback. As shown in FIG. 4, voltage feedback is achieved by connecting output voltage 212 to the Vsen pin on the HIP6301 via a resistor R222. Current feedback is achieved by feeding back a current signal from each phase, shown as Isen1 through Isen4, to the Isen1 through Isen4 pins on the HIP6301.

Though no current sharing circuit is shown in FIG. 3, such a circuit could be added to regulator 130A in a manner similar to that described above with respect to regulator 130B. Adding a current sharing circuit would make regulator 130A scalable in the sense that multiple regulator modules could then be connected in parallel to support larger current loads.

Figure 5B:
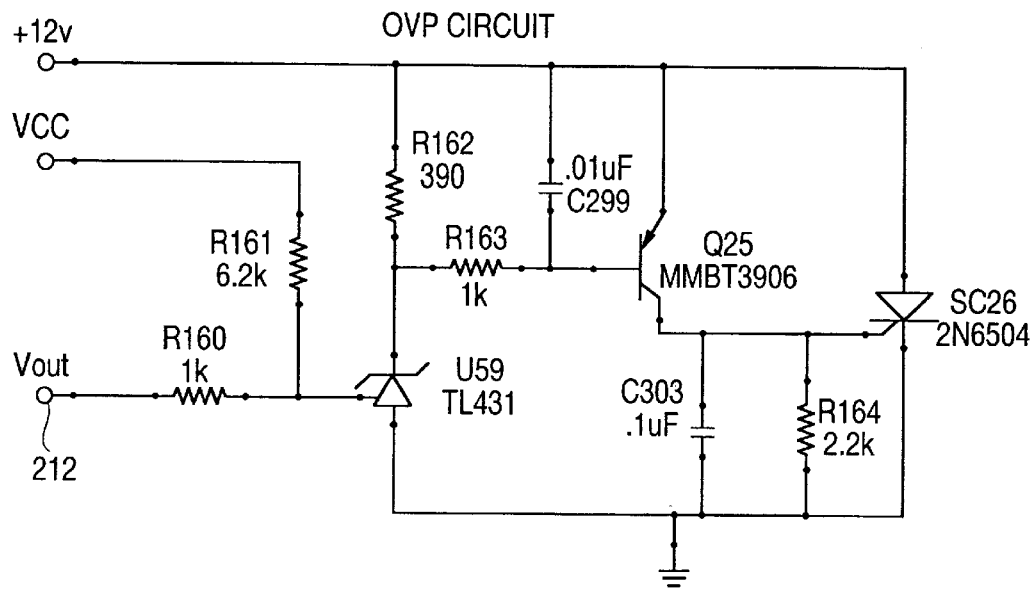
Figure 4A:
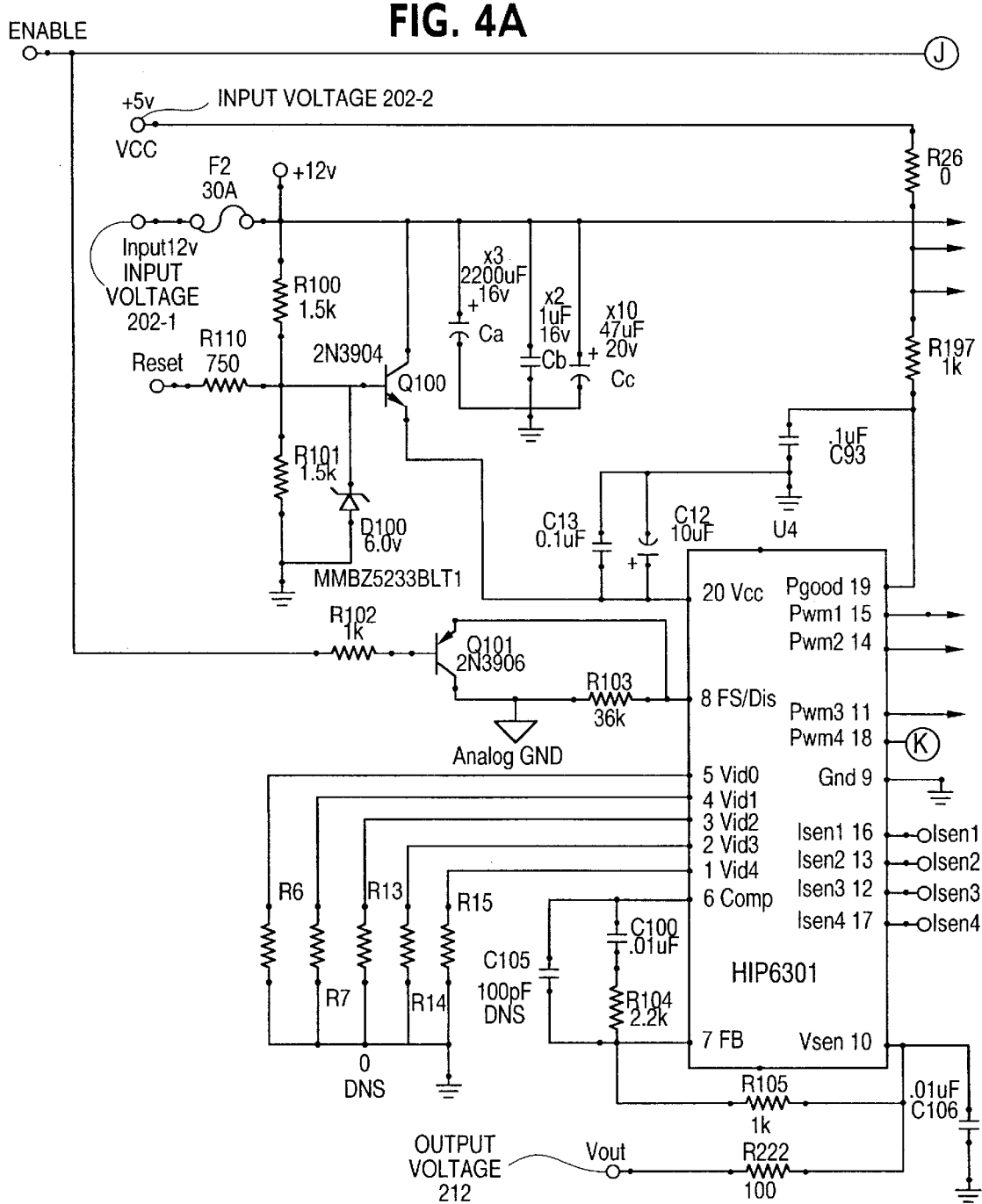
Figure 4B:
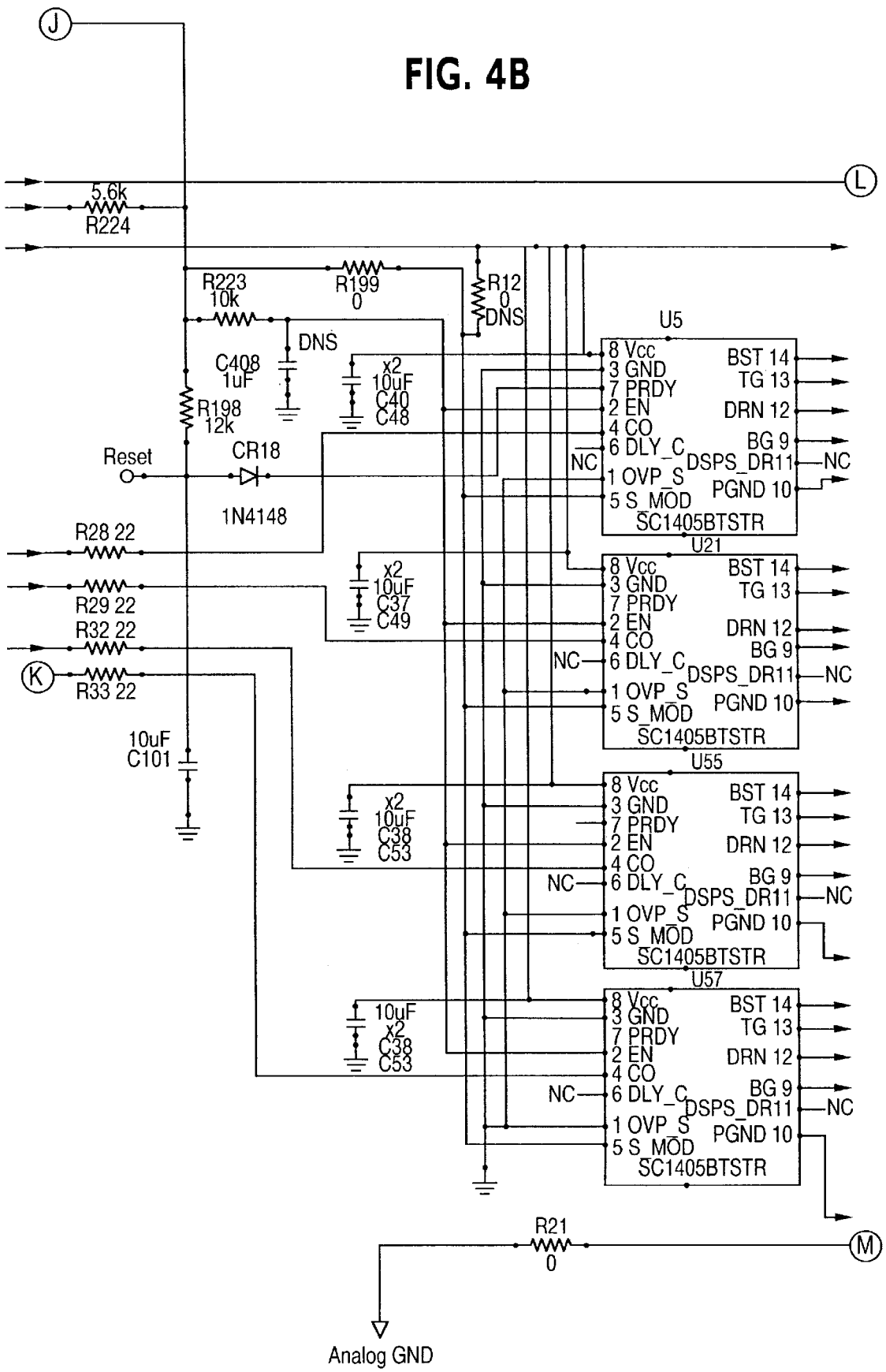
Figure 4C:
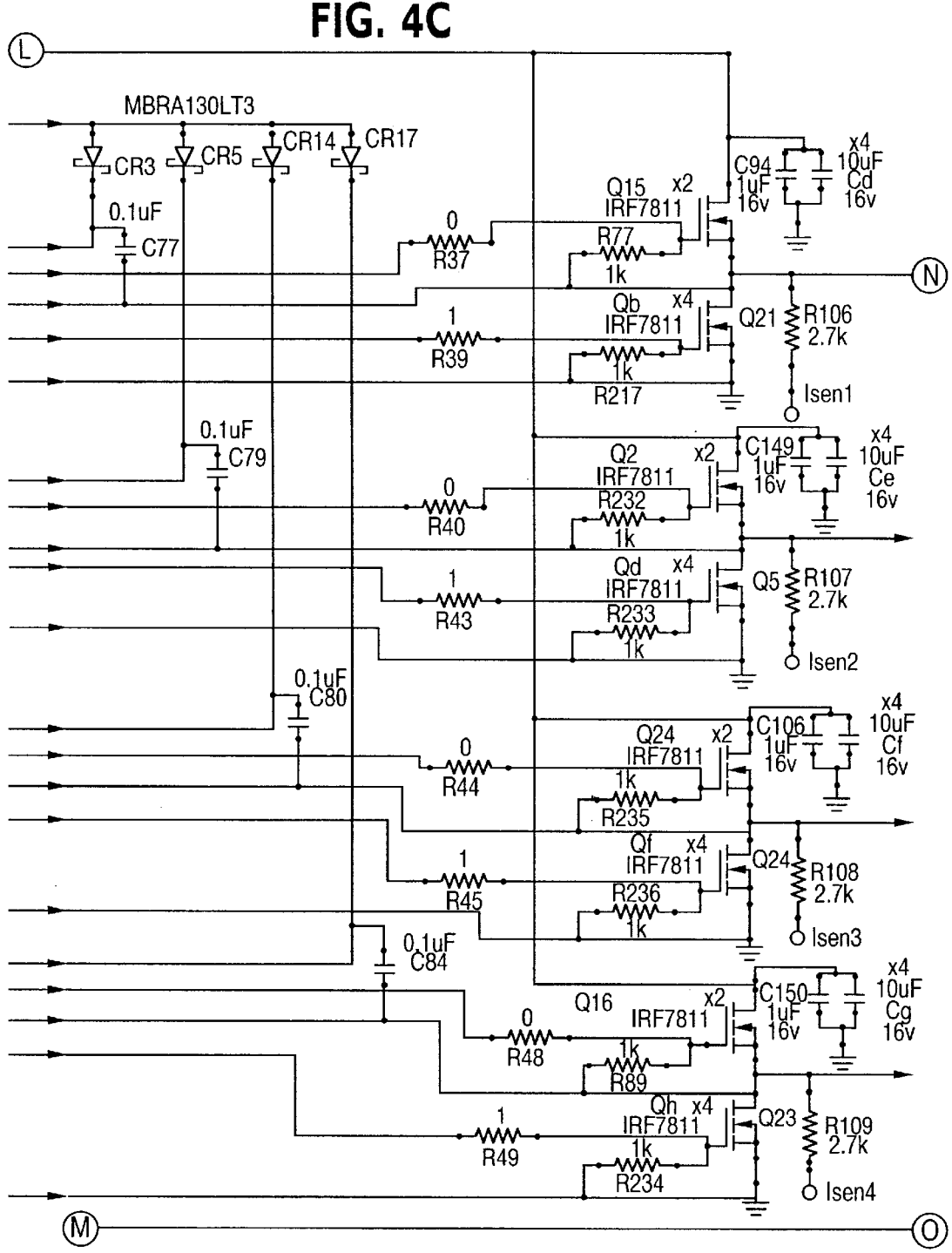
Figure 4D:
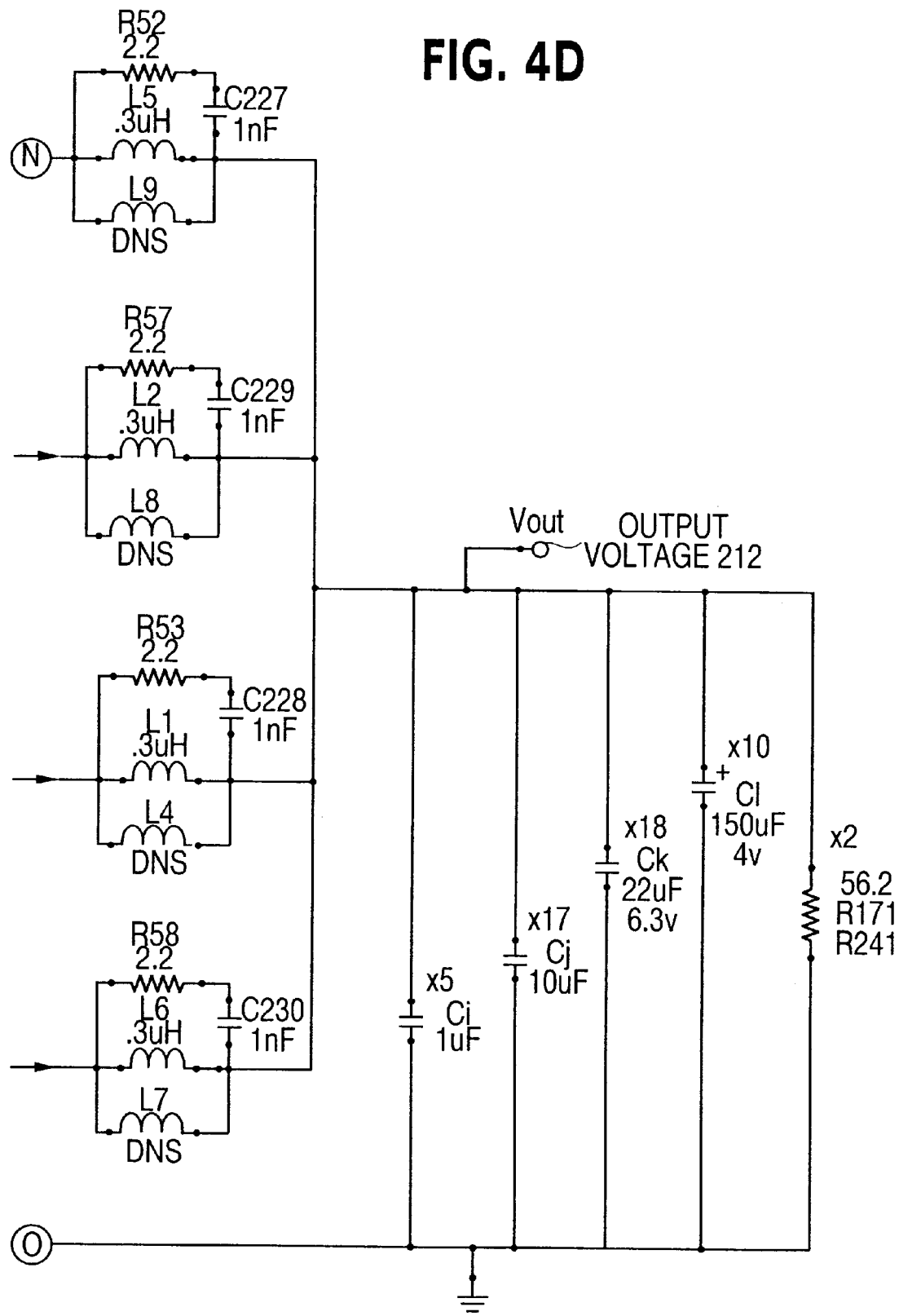

According to the example embodiment of the present invention, regulator 103B can also include an over-voltage protection circuit, an example of which is shown in FIG. 5B. The over-voltage protection circuit operates in a manner similar to the circuit described above with respect to FIG. 5A. This example over-voltage protection circuit includes resistors R160, R161, R162, R163, and R164, capacitors C299 and C303, a reference Zener diode U59 and synchronous controlled rectifier SC26, and a P-channel transistor Q25, configured as shown in FIG. 5B. Example values for the resistors and capacitors included within this example over-voltage protection circuit are shown in FIG. 5B. Reference Zener diode U59 can be implemented, for example, using TEXAS INSTRUMENTS regulator TL431. Synchronous controlled rectifier SC26 can be implemented, for example, using MOTOROLA rectifier 2N6504. P-channel transistor Q25 can be implemented, for example, using any P-channel transistor MMBT3906.

Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

For example, while the above example discussions describe sequence timing control 206 and drivers 208 as being implemented using separate parts, the sequence timing control may instead be implemented within drivers 208 rather than as a separate circuit. For example, SEMTECH's multi-phase current mode controller with I-share bus SC2424 includes a built-in sequence timing control circuit that operates in a manner similar to that described above with respect to FIGS. 3 and 4.

What is claimed is:

1. A DC-to-DC regulator, comprising:
   a multi-phase synchronous buck regulator including:
      a pulse width modulator to generate a plurality of switching signals, at least one of said switching signals being out-of-phase with respect to other ones of said switching signal,
      a plurality of drivers, each coupled to receive one of said switching signals, and
      a plurality of switching voltage converters, each coupled to receive an output from one of said drivers and an input voltage, wherein the outputs of said switching voltage converters are combined to form an output voltage, and
   wherein said multi-phase synchronous buck regulator is implemented on a motherboard.

2. The DC-to-DC regulator of claim 1, further comprising a droop circuit to add a droop voltage to said output voltage.

3. The DC-to-DC regulator of claim 2, wherein said multi-phase synchronous buck regulator is coupled to receive a plurality of input voltages, and wherein said multi-phase synchronous buck regulator further comprises a sequence timing control circuit to allow proper operation of said multi-phase synchronous buck regulator regardless of the sequencing of said input voltages.

4. The DC-to-DC regulator of claim 1, wherein said multi-phase synchronous buck regulator further comprises an over-voltage protection circuit.

5. The DC-to-DC regulator of claim 1, wherein said multi-phase synchronous buck regulator is implemented on a central processing unit chip.

6. The DC-to-DC regulator of claim 5, wherein said pulse width modulator comprises a programmable, multi-phase, high performance PWM controller.

7. The DC-to-DC regulator of claim 6, wherein each of said drivers comprises a high speed synchronous power MOSFET smart driver.

8. The DC-to-DC regulator of claim 7, wherein each of said switching voltage converters includes a plurality of switching MOSFETs, and an output inductor.

9. The DC-to-DC regulator of claim 1, wherein said multi-phase synchronous buck regulator is implemented on an interposer.

10. The DC-to-DC regulator of claim 9, wherein said pulse width modulator comprises a PWM controller.

11. The DC-to-DC regulator of claim 1,
    wherein the switching signals from one phase to a next phase are separated by 90°.

12. A DC-to-DC regulator, comprising:
    a plurality of multi-phase synchronous buck regulator modules, wherein each of said modules includes:
       a pulse width modulator to generate a plurality of switching signals, at least one of said switching signals being out-of-phase with respect to other ones of said switching signals,
       a plurality of drivers, each coupled to receive one of said switching signals,
       a plurality of switching voltage converters, each coupled to receive an output from one of said drivers and an input voltage, wherein the outputs of said switching voltage converters are combined to form an output voltage, and
       a current sharing circuit to insure that the current load is shared amongst said plurality of multi-phase synchronous buck regulator modules,
    and wherein said multi-phase synchronous buck regulator modules are implemented on a motherboard.

13. The DC-to-DC regulator of claim 11, wherein the switching signals from one phase to a next phase are separated by 90°.

14. A system comprising a DC-to-DC regulator comprising:
- a multi-phase synchronous buck regulator including:
  - a pulse width modulator to generate a plurality of switching signals, at least one of said switching signals being out-of-phase with respect to other ones of said switching signals,
  - a plurality of drivers, each coupled to receive one of said switching signals, and
  - a plurality of switching voltage converters, each coupled to receive an output from one of said drivers and an input voltage, wherein the outputs of said switching voltage converters are combined to form an output voltage, and
- wherein said multi-phase synchronous buck regulator is implemented on a motherboard.

15. The system of claim 14, further comprising a droop circuit to add a droop voltage to said output voltage.

16. The system of claim 15, wherein said multi-phase synchronous buck regulator is coupled to receive a plurality of input voltages, and wherein said multi-phase synchronous buck regulator further comprises a sequence timing control circuit to allow proper operation of said multi-phase synchronous buck regulator regardless of the sequencing of said input voltages.

17. The system of claim 14, wherein said multi-phase synchronous buck regulator further comprises an over-voltage protection circuit.

18. The system of claim 14, wherein said multi-phase synchronous buck regulator is implemented on a central processing unit chip.

19. The system of claim 18, wherein said pulse width modulator comprises a programmable, multi-phase, high performance PWM controller.

20. The system of claim 19, wherein each of said drivers comprises a high speed synchronous power MOSFET smart driver.

21. The system of claim 20, wherein each of said switching voltage converters includes a plurality of switching MOSFETs, and an output inductor.

22. The system of claim 14, wherein said multi-phase synchronous buck regulator is implemented on an interposer.

23. The system of claim 22, wherein said pulse width modulator comprises a PWM controller.

24. The system of claim 14,
wherein the switching signals from one phase to a next phase are separated by 90°.

25. A system comprising a DC-to-DC regulator comprising:
- a plurality of multi-phase synchronous buck regulator modules, wherein each of said modules includes:
  - a pulse width modulator to generate a plurality of switching signals, at least one of said switching signals being out-of-phase with respect to other ones of said switching signals,
  - a plurality of drivers, each coupled to receive one of said switching signals,
  - a plurality of switching voltage converters, each coupled to receive an output from one of said drivers and an input voltage, wherein the outputs of said switching voltage converters are combined to form an output voltage, and
  - a current sharing circuit to insure that the current load is shared amongst said plurality of multi-phase synchronous buck regulator modules,
- and wherein said multi-phase synchronous buck regulator modules are implemented on a motherboard.

26. The system of claim 25,
wherein the switching signals from one phase to a next phase are separated by 90°.

* * * * *